(12) United States Patent
Haronian

(10) Patent No.: US 11,879,764 B2
(45) Date of Patent: Jan. 23, 2024

(54) LIQUID HEIGHT LEVEL DEVICE

(71) Applicant: Dan Haronian, Efrat (IL)

(72) Inventor: Dan Haronian, Efrat (IL)

( * ) Notice: Subject to any disclaimer, the term of this patent is extended or adjusted under 35 U.S.C. 154(b) by 157 days.

(21) Appl. No.: 17/190,425

(22) Filed: Mar. 3, 2021

(65) Prior Publication Data
US 2022/0283011 A1  Sep. 8, 2022

(51) Int. Cl.
| | |
|---|---|
| *G01F 23/24* | (2006.01) |
| *G01F 23/263* | (2022.01) |
| *G01L 17/00* | (2006.01) |
| *H04Q 9/00* | (2006.01) |
| *B60C 19/12* | (2006.01) |
| *B60C 19/00* | (2006.01) |

(52) U.S. Cl.
CPC ............ *G01F 23/24* (2013.01); *B60C 19/122* (2013.01); *G01F 23/263* (2013.01); *G01L 17/00* (2013.01); *H04Q 9/00* (2013.01); *B60C 2019/004* (2013.01); *B60C 2200/12* (2013.01); *H04Q 2209/886* (2013.01)

(58) Field of Classification Search
CPC ....... G01F 23/24–248; B60C 2019/004; B60C 19/122; B60C 2200/12; B60C 19/12–127; B60C 23/0496–04985; G01L 17/00
See application file for complete search history.

(56) References Cited

U.S. PATENT DOCUMENTS

| | | | | |
|---|---|---|---|---|
| 2,889,545 A | * | 6/1959 | Allegrina | G01F 23/241 73/304 R |
| 4,284,951 A | * | 8/1981 | Dahl | G01F 23/242 73/304 R |
| 6,696,936 B2 | * | 2/2004 | Yamagiwa | B60C 23/006 340/447 |
| 7,571,646 B1 | * | 8/2009 | Houghton | G01F 23/242 73/304 C |
| 9,645,031 B2 | * | 5/2017 | Kanenari | G01L 17/00 |
| 11,179,979 B2 | * | 11/2021 | Kobler | B29C 73/166 |
| 11,485,179 B2 | * | 11/2022 | Agarwal | B60C 19/122 |
| 2018/0111345 A1 | * | 4/2018 | Barnett | B60C 99/00 |
| 2019/0373679 A1 | * | 12/2019 | Fu | H05B 3/0019 |
| 2023/0158843 A1 | * | 5/2023 | Sunayama | B60C 23/0498 137/231 |

FOREIGN PATENT DOCUMENTS

| | | | | |
|---|---|---|---|---|
| KR | 20140122624 A | * | 10/2014 | |
| KR | 20200077640 A | * | 7/2020 | |
| RU | 2570101 C2 | * | 12/2015 | |

* cited by examiner

*Primary Examiner* — Justin N Olamit

(57) ABSTRACT

A device for measuring a liquid level inside a tire that include two electrodes that are designed to be positioned inside the tire in such a way that they can be immersed inside the liquid that the tire may contain, and an electric circuit that is electrically connected to these electrodes. The device is designed to measure an electric property of the liquid between the electrodes while the intensity of the electric property depends on the liquid level inside the tire. The electric circuit is designed to output an electric value for the measured electric property as an output signal that can be used to calculate the level of the liquid inside the tire.

2 Claims, 15 Drawing Sheets

LIQUID HEIGHT LEVEL DEVICE

BACKGROUND OF THE INVENTION

Sealing liquid is used for sealing holes created in closed flexible and inflated structures such as tubeless tires for vehicles. The sealing liquid is inserted inside the tire and seals holes or gaps that are created during the operation of the tire. In addition, the water content of the liquid may evaporate over time. Since the tire is sealed it is impossible to know the liquid level and its properties which makes it hard to control the quality of this solution.

SUMMARY OF THE INVENTION

This patent application is related to sealing liquid measuring device that is based on measuring the liquid electric properties such as resistance or capacitance. The device uses electrodes inserted inside the tire and measures the level of the liquid either in real time or at rest and at specific position of the tire.

DETAILED DESCRIPTION OF THE INVENTION

Figure 1:
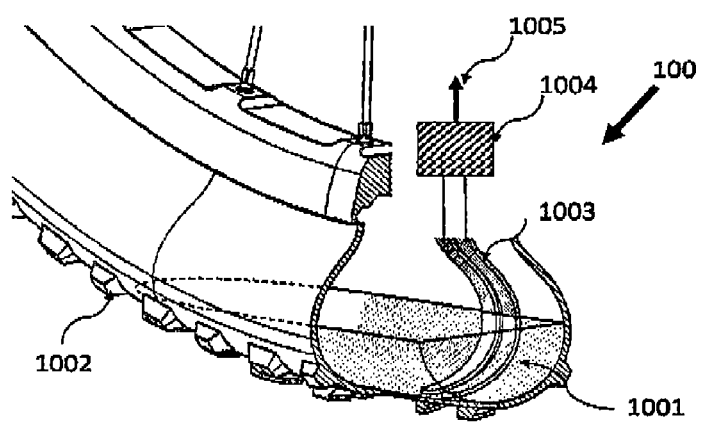
FIG. 1 depicts a general embodiment of this invention.

This patent application is of a device for measuring the level or volume of sealing liquid inside a closed volumes such as inside an inflation tire mounted on a rim. In this patent application the invention will be described on a bicycle tire, but it is clear that this patent application may be applied to any device that uses inflation tire. A general embodiment is described in FIG. 1. The device comprises two electrodes immersed inside the liquid for measuring an electric property of the said liquid, and an electric circuit with output signal such that said electric property depends on the liquid height level and such that the said electric property affects the intensity of said output signal and such that said output signal is a measure to the liquid height level. The electrodes may be made of conductive flexible material such as conductive polymer or polymer with imbedded thin metal sheet.

Most sealing liquid are electrically conductive. Resistance measurement of a conductive material with input port and output port is done by applying DC voltage between the two ports and measuring the current flowing through the conductive material. Dividing the voltage drop by the current is the resistance of the conductive material. Measuring the resistance of a conductive liquid by measuring the resistance between two electrodes immersed inside the liquid may lead to breakdown of the liquid and sedimentation of the backdown materials on the electrodes and is therefore not applicable. In order to avoid such problems this patent application teaches measuring the resistivity by applying a short voltage pulse such that the pulse comprises similar positive and negative parts. Such a pulse may create a short back and forth drift and will not affect the liquid properties.

Figure 2B:
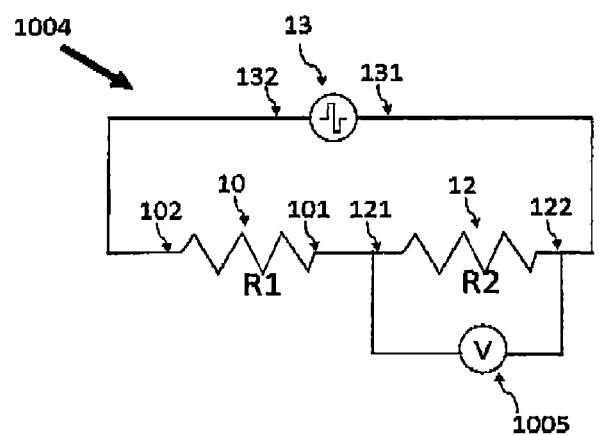
FIGS. 2a and 2b depict schematically one embodiment of measuring conductive liquid height level.
Figure 2A:
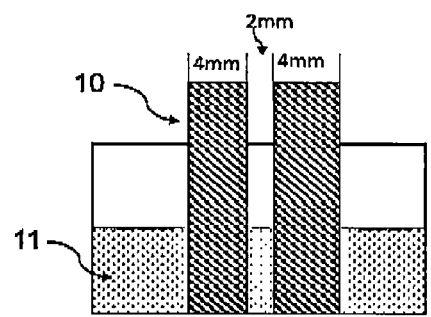

FIG. 2a describes two electrodes (10) immersed in liquid (11) with given volume resistance. In this specific design the electrodes are 4 mm wide and 2 mm apart. The resistance between two electrodes is denoted by R1. As water in the liquid evaporates, the level of liquid drops and R1 changes and therefore its value may be used as a measure to the liquid height.

$$R_1 = \rho \frac{L}{wf(h)} = \frac{L}{f(h)} \frac{\rho}{w}$$

Where ρ is the liquid resistivity that depends on the volume concentration of ions and free electrons. As water evaporates the concentration of ion and free electrons increase and therefore the liquid resistivity decreases. L is the distance between the two electrodes, w is liquid height level (length of liquid in contact with the electrodes) and f(h) is a value that is function of the height above the plan of the electrodes.

Since L is constant and it is possible to assume that ƒ(h) is fixed as well, we find that R1 depends $$\frac{\rho}{w}$$

and since both ρ and w decrease as water evaporate, we find that ρ have opposite effect on R1. Yet, the change in ρ is weaker since it affects the volume of the liquid while the of first degree. We therefore find that R1 increases as the liquid level drops.

FIG. 2b describes one example of a circuit (100) for measuring R1. In this example the two electrodes (10) are connected in series to a load resistor R2. A voltage pulse is applied by a voltage source (12) and the voltage drop on R2 is measured by a voltage meter (13).

The current flowing in the circuit is $$I = \frac{v}{R_1 + R_2},$$

and therefore the voltage drop on R2 is $$V_{R2} = \frac{VR_2}{R_1 + R_2}.$$

Since V, and R2 are known, by measuring $V_{R2}$ it is possible to find the value of R2.

One question is the sensitivity of $V_{R2}$ to changes in R1 due to liquid height level.

The derivative of $V_{R2}$ relative to R1 is $$\frac{dV_{R2}}{dR_1} = -\frac{VR_2}{(R_1 + R_2)^2}.$$

By comparing this derivative to zero we find that the maximum sensitivity is when R2=R1.

Since R1 is the resistivity between the two electrodes and its value changes as the level of the liquid changes, the optimal value of R2 is not constant.

Figure 3:
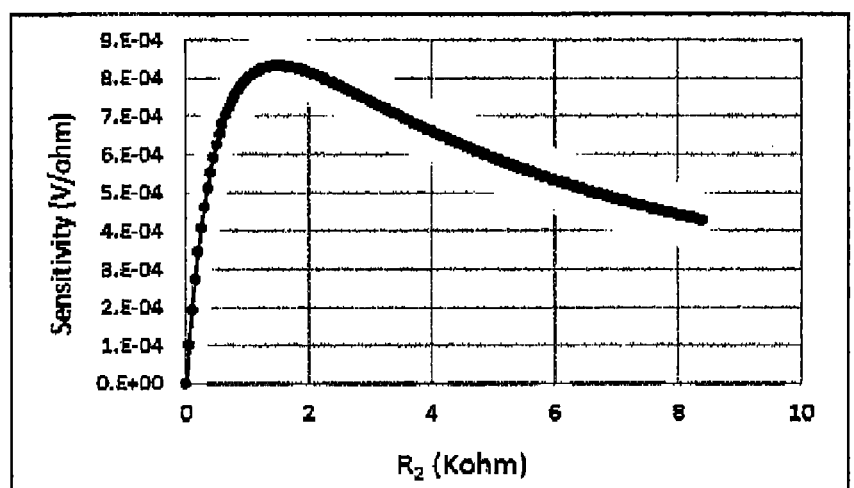
FIG. 3 is a graphic description of calculated sensor sensitivity function.

For the two electrodes described in FIG. 2a and for liquid ECO SEALANT manufactured by company called JOE'S. The liquid mostly contains water. the liquid resistance R1 was measured to be 0.71 KΩ at liquid height of 21 mm and after water evaporation and height drop to 17 mm the liquid resistance R1 was measured to be 1.26 KΩ. FIG. 3 shows the sensitivity as a function of R2 for R1=1.5 KΩ. As shown in FIG. 3 the peak of the sensitivity function relatively wide around R2=1.5 KΩ. In addition, the slope of the sensitivity function for R2>01.5 KΩ is much smaller than that for R2<1.5 KΩ and therefore R2 that are a bit higher than 1.5 KΩ will also generate high sensitivity to changes in R1.

Figure 4:
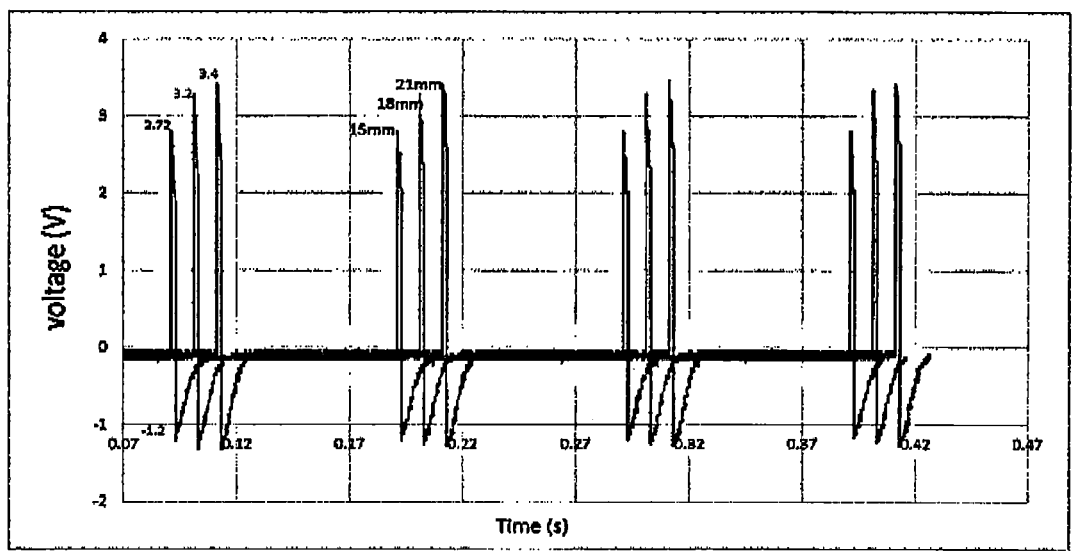
FIG. 4 is a graphic description of measurement of voltage drop on R2 in the circuit described in FIGS. 2a and 2b for different level of liquid heights.
Figure 5A:
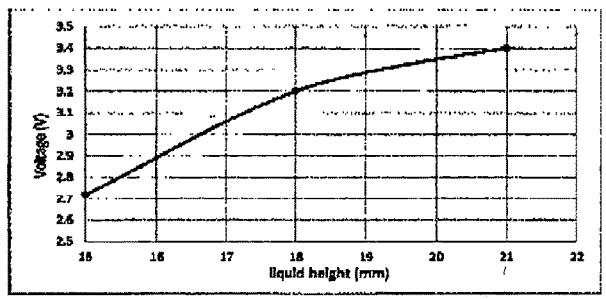
FIGS. 5a and 5b are a graphic description Voltage on R2 as a function of the liquid height.
Figure 5B:
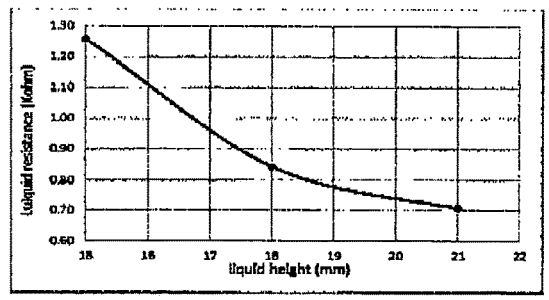

FIG. 4 described the voltage (13) measured on R2 in the circuit described in FIG. 1b, for different ECO SEALANT liquid height. The change in height in this experiment is due to change in water content of the liquid and therefore represent evaporation of the water during normal use of the liquid. The voltage source (12) is a 5 V pulse at 2 ms width and rate of 10 Hz. FIG. 5a described the peak of the voltages shown in FIG. 4 as a function the liquid height and FIG. 5b describes the resistance of ECO SEALANT liquid as function of the liquid height.

Figure 6:
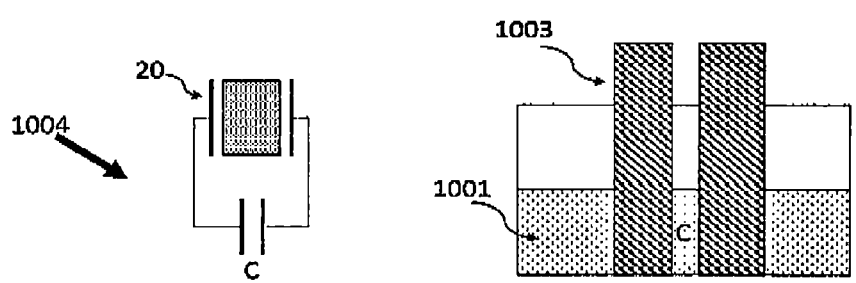
FIG. 6 depicts a general embodiment dielectric liquid capacitance using resonator.

For dielectric non resistive liquids the liquid height level may be measured through the change in the capacitance between two electrodes immersed inside the liquid. This can be done for example by using the circuit shown in FIG. 6 that describes a general embodiment for measuring capacitance. This embodiment describes a device (200) for measuring height of dielectric liquid using an oscillator (20) connected two electrodes (1003) immersed inside liquid (1001). The capacitance between the two electrodes depends on the height of the liquid and the frequency of the oscillator (20) depends on the capacitance between the two electrodes. Therefore, changes in the frequency of the oscillator are a measure to the changes in the liquid height.

Figure 7:
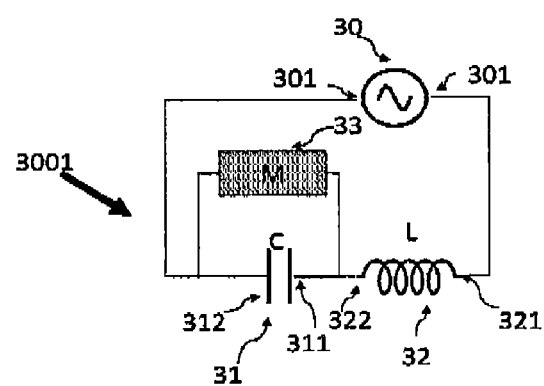
FIG. 7 depicts one embodiment of dielectric liquid capacitance using resonator.

Another embodiment of this invention is shown in FIG. 7. Here a device for measuring dielectric liquid height (2001) comprising a capacitor C (31) that is the capacitance between two electrodes immersed inside the dielectric liquid, and inductor L (32) with known value, both forming an LC resonator. The resonance frequency of the resonator is $$f_r = \frac{1}{2\pi\sqrt{LC}}.$$

A power source (30) is connected in series to the inductor and to the capacitor. An oscillating voltage source (30). By Sweeping the oscillating frequency of the voltage source a peak in the voltage drop is found for example by measuring the voltage drop on the inductor or as shown in FIG. 7 by measuring the voltage drop on the capacitor using a meter (33). Since L is known and $f_r$ is found from sweeping the frequency spectrum, C can be determined, as well as changes in C that reflects changes in the liquid height.

Figure 8:
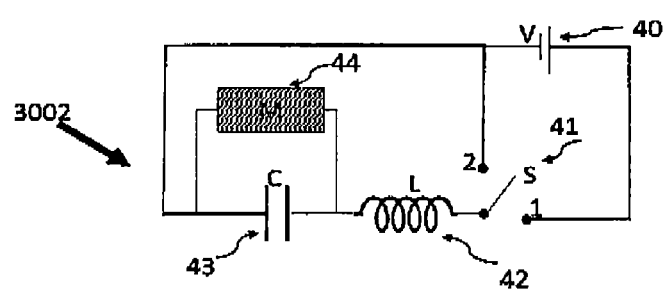
FIG. 8 depicts another embodiment of dielectric liquid capacitance using resonator.

In another embodiment of the embodiment described in FIG. 8, a dielectric liquid height measuring device (2002) comprises a DC power source (40). The capacitor (43) is the capacitor formed between two electrodes immersed inside a dielectric liquid. Inductor (42) is an inductor with known value. By flipping switch (41) to state 1, the power source is connected to the inductor and to the capacitor circuit and the capacitor is charged to voltage V of the DC voltage source. Flipping switch (41) to state 2 disconnect the power source and connect the capacitor to the inductor that excites a resonant oscillation of current flow between the inductor and the capacitor. Typically, these oscillation dies out as a results of internal resistance R of the inductor, the capacitor, and the wires. The frequency of the oscillating current is a function of the inductance L, the capacitance C and to small extent on the resistance R. Since the value of the inductor L is fixed and R is either fixed or negligible, it is possible to determine the capacitance between the two electrodes. Therefore, changes in the capacitance due to liquid height is reflected by changes in the current oscillating frequency. In another embodiment the inductor L, the capacitor C and the power source are connected to each other in parallel.

Figure 9:
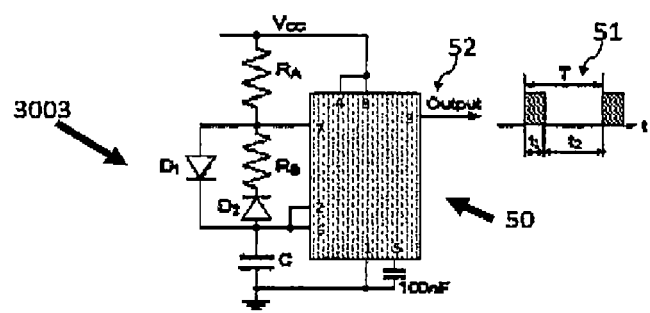
FIG. 9 depicts yet another embodiment of dielectric liquid capacitance using resonator.

FIG. 9 describes another embodiment of a device for measuring dielectric liquid height (2003) comprising a 555 timer chip (50) designed as an oscillator with oscillating frequency that depends on capacitance C, between two electrodes immersed inside the dielectric liquid. The time interval T (51) at the output (52) from the 555 timer chip is $T=t_1+t_2=0.693R_AC+0.693R_BC$, and the frequency of the oscillator is $f=1/[0.693C(R_A+R_B)]$. Since $R_A$ and $R_B$ are known, the liquid height may be determined through changes in the oscillating frequency of the oscillator due to change in the capacitance C.

The sensitivity of the oscillator to changes in the capacitance C and therefore in the liquid height is $df=dc/[0.693C^2(R_A+R_B)]$. It is therefore preferred to use low values for resistors $R_A+R_B$.

Figure 10:
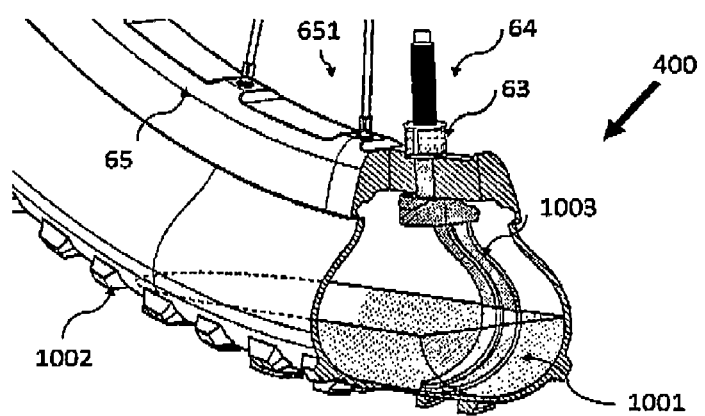
FIG. 10 depicts an embodiment of liquid height level measuring device in a tire.

One embodiment of a sensor for measuring the height of sealant (400) of a conductive liquid sealant or dielectric sealant (1001) is described in FIG. 10. The two electrodes (1003) are shown fixed to one side of the tire (1002) and are connected to valve electrodes (63) through the tire valve (64) that is fixed to the tire rim (65). The valve electrodes (63) allow measurement of electric properties such as resistance or capacitance electric circuit (1004) shown schematically in FIG. 1 and in details in FIG. 2 through 9. The measurement may be done when the valve is facing the ground and the liquid accumulate around the electrodes or it can be done during wheel rotation where the analysis for converting the electric property of the liquid to liquid level is different.

Figure 11:
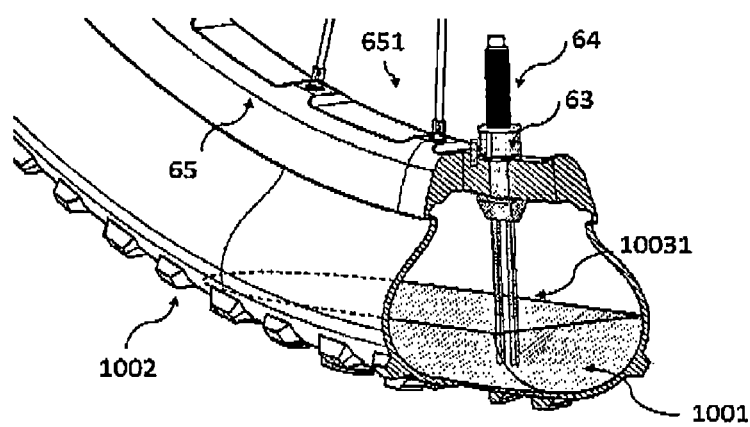
FIG. 11 depicts another embodiment of liquid height level measuring device in a tire.

Fixing the electrodes to the side of the tire is preferable in order to prevent interference of liquid flow. Yet, electrodes (1003) may also have different geometry such as shown in FIG. 11 with vertical electrodes (10031).

Figure 12A:
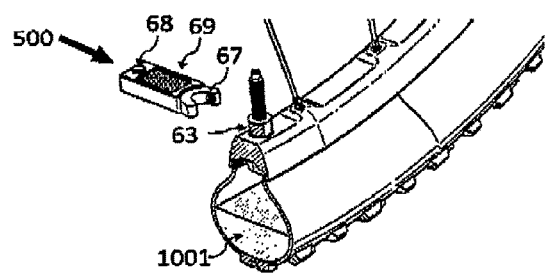
FIGS. 12a, 12b and 12c depict an embodiment of a plug in device for measuring liquid level in a tire.
Figure 12B:
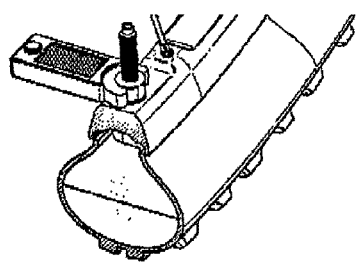
Figure 12C:
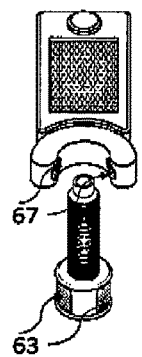

Another embodiment of a sensor for measuring the height of sealant (1001) through its electric properties is described in FIG. 12, showing an external plugin module (500) with electric pads (67) that are designed to be connected to the valve electrodes (63) for measuring the liquid level height through its electrical properties.

Figure 13:
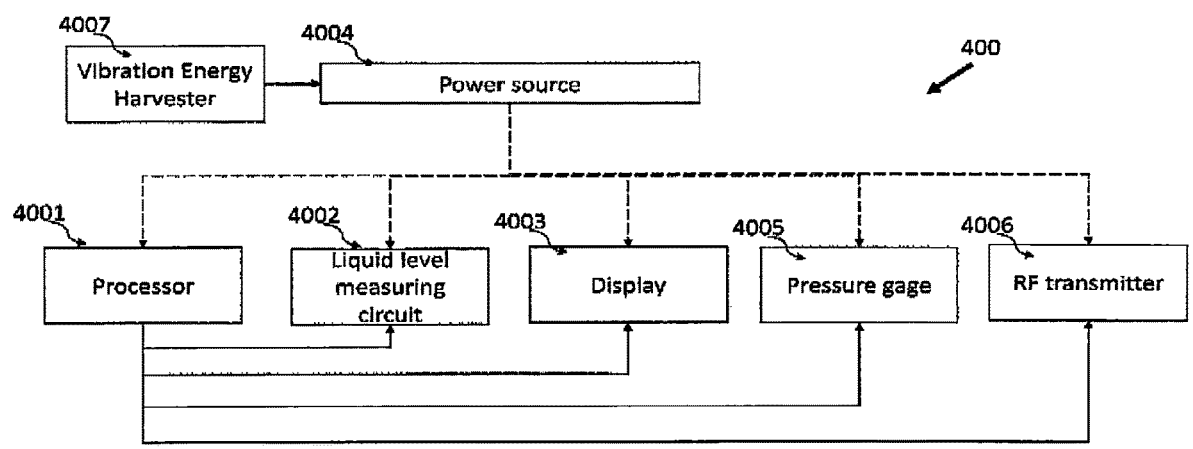
FIG. 13 is a schematic description of components of the plug-in device described in FIGS. 12a-12c.

A schematic of a possible module (400) is described in FIG. 13. The module may include a processor (4001) for managing the liquid height measurement, a liquid height measuring circuit (4002), a display (4003) for displaying the liquid height and a power source (4004) that may be a rechargeable battery. The module may also include a pressure gauge (4005) for measuring the tire pressure a transmitter (4006) for transmitting measured data from the module to an external receiver such as mobile phone, and a vibration energy harvester (4007) for recharging the battery and for powering the different devices in module (400).

Figure 14:
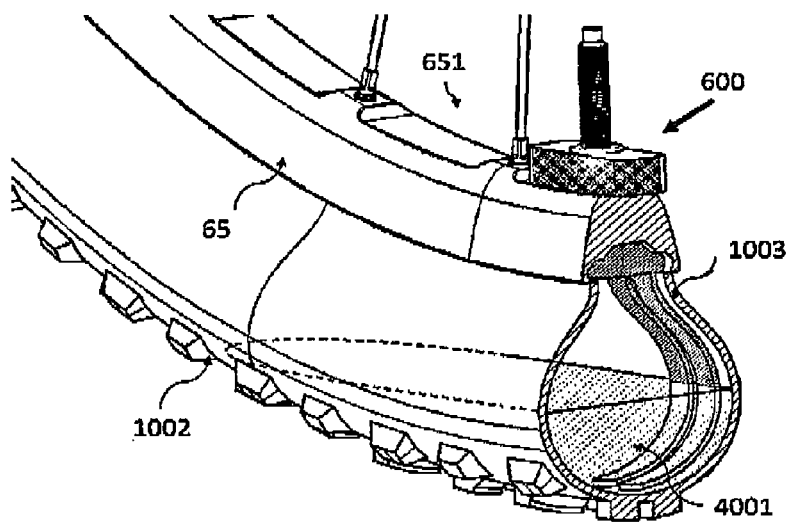
FIG. 14 depicts an embodiment of a device for measuring liquid level in a tire, fixed to the tire rim.
Figure 15:
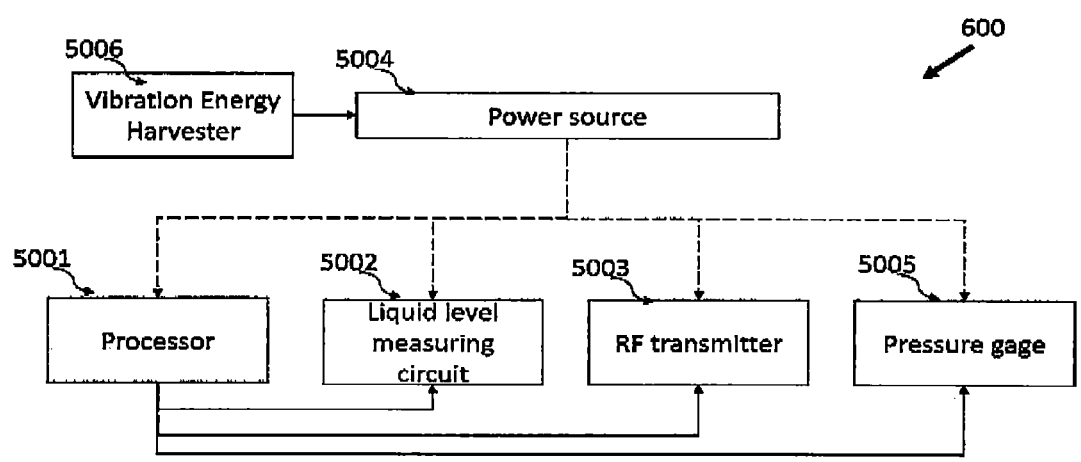
FIG. 15 is a schematic description of components of the plug-in device described in FIG. 14.

Another embodiment of a sensor for measuring the height of sealant (4002) through its electric properties is described in FIG. 14, showing a module (600) that is designed to be fixed to the rim (64) and includes the tire valve (63). A schematic of a possible module (600) is described in FIG. 15. The module may include a processor (500) for managing the liquid height measurement, a liquid height measuring circuit (5002), a transmitter (5003) for transmitting measured data from the module to an external receiver such as mobile phone and a power source (5004) that may be a rechargeable battery. The module may also include a pressure gauge (5005) for measuring the tire pressure, and a vibration energy harvester (5006) for recharging the battery and for powering the different devices in module (500).

In summary, the present invention refers to the A device (100) for measuring a liquid level (1001) inside a tire (1002) that comprises two electrodes (1003) that are designed to be positioned inside the tire in such a way that said two electrodes can be immersed inside the liquid that the tire may contain, and an electric circuit (1004) that is electrically connected to the two electrodes. The device is designed to measure an electric property of the liquid between the two electrodes, wherein an intensity of said electric property depends on the liquid level inside the tire. The electric circuit (1004) is designed to output an electric value for the measured electric property as an output signal (1005). The output signal can be used to calculate the level of the liquid inside the tire. The electric property can be a resistance or a capacitance of the liquid.

The device, when said electric circuit (1004) comprises a resistor (12) connected from a first side (121) to one of said two electrodes (101) and from a second side (122) to a first terminal (131) of a pulse generator (13); wherein a second of said two electrodes (102) is connected to a second terminal (132) of the pulse generator (13); wherein said pulse generator can generate a pulse with a positive and negative polarity that can generate a pulse of voltage drop on said resistor wherein said pulse of voltage drop serves as said output signal (1005).

The device, wherein a resistance value of said resistor is greater than a half of a resistance value between said two electrodes when ten percent of them are covered with said liquid.

The device wherein said electric circuit (1004) comprises an oscillator (20) that is electrically connected to said two electrodes (1003); wherein said oscillator is designed to produce oscillating electronic signals in a frequency that is depends on said capacitance of said liquid and wherein said frequency serves as said output signal (1005).

The device wherein said electric device (3001) includes an alternating power source (30), a measuring device (33) and an inductor (32), and wherein said two electrodes comprises a first electrode (311) and a second electrode (312). The measuring device is connected in parallel to the two electrodes and is designed to measure alternating voltage between the two electrodes. A first terminal (301) of the alternating power source is electrically connected to a first terminal (321) of the inductor, and a second terminal (301) of the alternating power source is electrically connected to the second electrode, and wherein a second terminal (322) of the inductor is electrically connected to the first electrode. The alternating power source can induce electrical voltage at varying frequencies in a way that enable the measuring device to detect a peak of the alternating voltage on the two electrodes, or induce a voltage or current pulse that causes an alternating current to flow between a capacitance formed between the two electrodes and the inductor in a certain oscillating frequency; and wherein changes in said peak alternating voltage or changes in a frequency of said alternating current can be used to calculate said liquid level inside the tire.

The device wherein said oscillator is kind of a Ring Oscillator, Colpitts Oscillator, Pierce Crystal Oscillator, CMOS Crystal Oscillator, Microprocessor Oscillator, Hartley Oscillator, RC Oscillator, Wien Bridge Oscillator, or Twin-T Oscillator or 555 timer chip configured as an oscillator.

The device that further includes two valve electric pads (63) that are connected to said electrodes and are designed to be assembled on an outer side (651) of a rim (65) to which the tire is intended to be placed, and are designed to connect said two electrodes to said electric circuit (1004).

The device wherein said valve electric pad (63) is designed to electrically communicate with a module (500) that include an electric pads (67) in a way that enables the valve electric pad (63) to measure said electric properties; wherein the module includes a rechargeable battery, an on/off button (68), a measuring circuit for measuring said electric property and a display (69) that can display said liquid level inside the tire.

The device that further includes a pressure gauge for measuring pressure inside the tire to be displayed on said display or an RF transmitter for transmitting data from the device to a receiver.

The device that further includes a module (600) that comprises said electric circuit, a transmitter and a rechargeable battery for powering the module; wherein said module is designed to be assembled on an outer side (651) of a rim (65) to which the tire is intended to be placed, and wherein said transmitter is designed to transmit data from the said device to a receiver.

The device that further includes a pressure gauge for measuring pressure inside the tire, a processor for managing a measurement process of the device, a vibration energy harvester for converting vibration energy into electric energy wherein said electric energy can be used to charge said rechargeable battery or said module.

What is claimed is:

1. A device for measuring a liquid level inside a tire, comprising:
   a module that includes a tire valve, an electric circuit, and aa power source, wherein said module is designed to be fixed to a rim of the tire on an exterior of the tire; and
   two electrodes that are designed to be connected to said module, wherein said two electrodes are designed to be positioned inside the tire in such a way that said two electrodes are capable of being immersed inside liquid inside the tire;
   wherein the electric circuit is designed to be electrically connected to the two electrodes;

wherein the electric circuit is designed to measure an electric property of liquid between the two electrodes, wherein an intensity of said electric property depends on the liquid level inside the tire;

wherein the electric circuit is designed to output an electric value as an output signal for the measured electric property; and wherein said output signal is capable of being used to measure the liquid level inside the tire.

2. The device of claim 1, wherein said power source is a vibration energy harvester for converting vibration energy into electric energy that is designed to supply energy to said module.

* * * * *